(12) United States Patent
Jayaraman et al.

(10) Patent No.: US 10,102,053 B2
(45) Date of Patent: Oct. 16, 2018

(54) SYSTEMS AND METHODS FOR PREDICTING AND DISPLAYING SITE SAFETY METRICS

(71) Applicant: Honeywell International Inc., Morristown, NJ (US)

(72) Inventors: Manikandan Jayaraman, Bangalore (IN); Antony John Paul, Coimbatore (IN); Ajin Mathew, Ponkunnam (IN); Vijetha Gari, Hindupur (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 166 days.

(21) Appl. No.: 15/209,455

(22) Filed: Jul. 13, 2016

(65) Prior Publication Data

US 2018/0018213 A1    Jan. 18, 2018

(51) Int. Cl.
| | |
|---|---|
| *G06F 11/07* | (2006.01) |
| *G05B 23/02* | (2006.01) |
| *G06Q 10/06* | (2012.01) |
| *G05B 9/02* | (2006.01) |
| *G05B 15/02* | (2006.01) |

(Continued)

(52) U.S. Cl.
CPC ...... *G06F 11/0781* (2013.01); *G05B 23/0267* (2013.01); *G05B 23/0278* (2013.01); *G06F 11/0709* (2013.01); *G06F 11/079* (2013.01); *G06F 11/0736* (2013.01); *G06F 11/0754* (2013.01); *G06F 11/0769* (2013.01); *G06F 11/0787* (2013.01); *G06Q 10/0635* (2013.01); G05B 9/02 (2013.01); G05B 15/02 (2013.01); G05B 19/0428 (2013.01); G05B 19/4184 (2013.01); G05B 23/021 (2013.01); G05B 2219/25011 (2013.01);

(Continued)

(58) Field of Classification Search
CPC .................................................... G06F 11/07
USPC ............................................................ 714/57
See application file for complete search history.

(56) References Cited

U.S. PATENT DOCUMENTS

| | | | | |
|---|---|---|---|---|
| 8,924,493 B1 * | 12/2014 | Yeskel | ............. | G06F 9/542 |
| | | | | 709/206 |
| 9,196,148 B1 * | 11/2015 | Hutz | ............. | G08B 21/18 |

(Continued)

FOREIGN PATENT DOCUMENTS

| | | |
|---|---|---|
| CN | 103870716 A | 6/2014 |
| WO | WO 2013/134750 A1 | 9/2013 |

OTHER PUBLICATIONS

Extended European search report for corresponding EP patent application 17178512.4, dated Nov. 24, 2017.

(Continued)

*Primary Examiner* — Kamini B Patel
(74) *Attorney, Agent, or Firm* — Husch Blackwell LLP

(57) ABSTRACT

Systems and methods for predicting and displaying site safety metrics are provided. Some methods can include assigning respective risk index values to each of a plurality of devices, storing the respective risk index values in a memory device, identifying respective faults of each the plurality of devices in fault, retrieving, from the memory device, the respective risk index values of each of the plurality of devices in fault, prioritizing the respective faults of each of the plurality of devices in fault based on the respective risk index values of the plurality of devices in fault, and transmitting a notification message indicative of the prioritized respective faults.

16 Claims, 3 Drawing Sheets

(51) Int. Cl.
  *G05B 19/042* (2006.01)
  *G05B 19/418* (2006.01)
  *G08B 17/12* (2006.01)
  *G08B 25/00* (2006.01)
  *G08B 29/04* (2006.01)

(52) U.S. Cl.
  CPC .. *G05B 2219/31461* (2013.01); *G08B 17/125* (2013.01); *G08B 25/005* (2013.01); *G08B 29/04* (2013.01)

(56) References Cited

U.S. PATENT DOCUMENTS

| | | | | |
|---|---|---|---|---|
| 2001/0052562 | A1* | 12/2001 | Ishihara | G05D 1/0676 244/175 |
| 2006/0195235 | A1* | 8/2006 | Ishihara | G01C 23/00 701/16 |
| 2007/0276600 | A1* | 11/2007 | King | G08G 1/042 701/301 |
| 2009/0228980 | A1* | 9/2009 | Zingelewicz | G07C 9/00111 726/22 |
| 2010/0156630 | A1* | 6/2010 | Ainsbury | G07C 9/00103 340/540 |
| 2011/0061015 | A1* | 3/2011 | Drees | G05B 15/02 715/771 |
| 2011/0298603 | A1* | 12/2011 | King | G08G 1/042 340/436 |
| 2011/0298608 | A1* | 12/2011 | Ranjan | G05B 23/0272 340/519 |
| 2013/0063264 | A1* | 3/2013 | Oktem | G05B 23/024 340/540 |
| 2016/0163186 | A1* | 6/2016 | Davidson | G06Q 50/16 340/506 |

OTHER PUBLICATIONS

English language translation of abstract of CN103870716 (A).
News-Fix—New Details of Desperate Rescue Attempt in Fatal Mission Fire, May 11, 2015 http://ww2.kqed.org/news/2015/05/11/s-f-medical-examiners-report-reveals-new-details-of-rescue-in-fatal-mission-fire.
Simcoe.com, Orillia tenant charged for disabling smoke alarm, May 25, 2015, http://www.simcoe.com/news-story/5642849-orilla-tenant-charged-for-disabling-smoke-alarm/.

* cited by examiner

SYSTEMS AND METHODS FOR PREDICTING AND DISPLAYING SITE SAFETY METRICS

FIELD

The present invention relates generally to safety and security systems in a monitored site. More particularly, the present invention relates to systems and methods for predicting and displaying site safety metrics.

BACKGROUND

Safety and security systems, such as fire alarm systems, that monitor a site are known in the art. However, when multiple faults occur in a safety and security system, it can be a challenge for a user to identify the risks associated with each fault and to prioritize the faults and the work necessary to address each of the faults.

Furthermore, when maintenance work is performed on a safety and security system, a user may be unable to estimate asset liability caused by the failure of the safety and security system. Indeed, when a safety and security system device, such as a sensor device or a video camera, or a zone monitored by a safety and security system is disabled by a user for maintenance, or for any other reason, users are not notified of the maintenance and the costs of assets at risk, and the potential risks involved are not identified by the system or conveyed to users. When maintenance work is completed and a sensor device, video camera, or zone is re-enabled, it is not uncommon for a user to forget to remove precautionary devices, such as protective covers for a smoke detector or sprinkler, an auxiliary power disconnection, an exit area clearance, and the like. Accordingly, the future detection of a safety and security conditions, such as a fire, can fail.

In known systems, when a fault is detected, the fault is reported to a user interface monitored by a user. The user sends a request to a third party vendor to respond to and rectify the fault, but the transmitted request and the response thereto can be based on the user or third party's own assessment of a plurality of factors, including available man power, space, equipment, and the like. Indeed, the user transmitting the request to the third party and the third party responding to the request can base their actions on their own understanding of the monitored site, risk level at the location of the detected fault, assets being protected by the system, available hardware and manpower, or alternate protection available to the fault location. Accordingly, responding to a detected fault provides many opportunities for human error, including manually assessing and improperly downgrading the risks involved. Furthermore, known safety and security systems fail to prioritize high risk faults to facilitate immediate response thereto and rectification thereof by notifying an appropriate user via a medium appropriate for the high risk nature of the fault.

In view of the above, there is a continuing, ongoing need for improved systems and methods.

DETAILED DESCRIPTION

Figure 1:
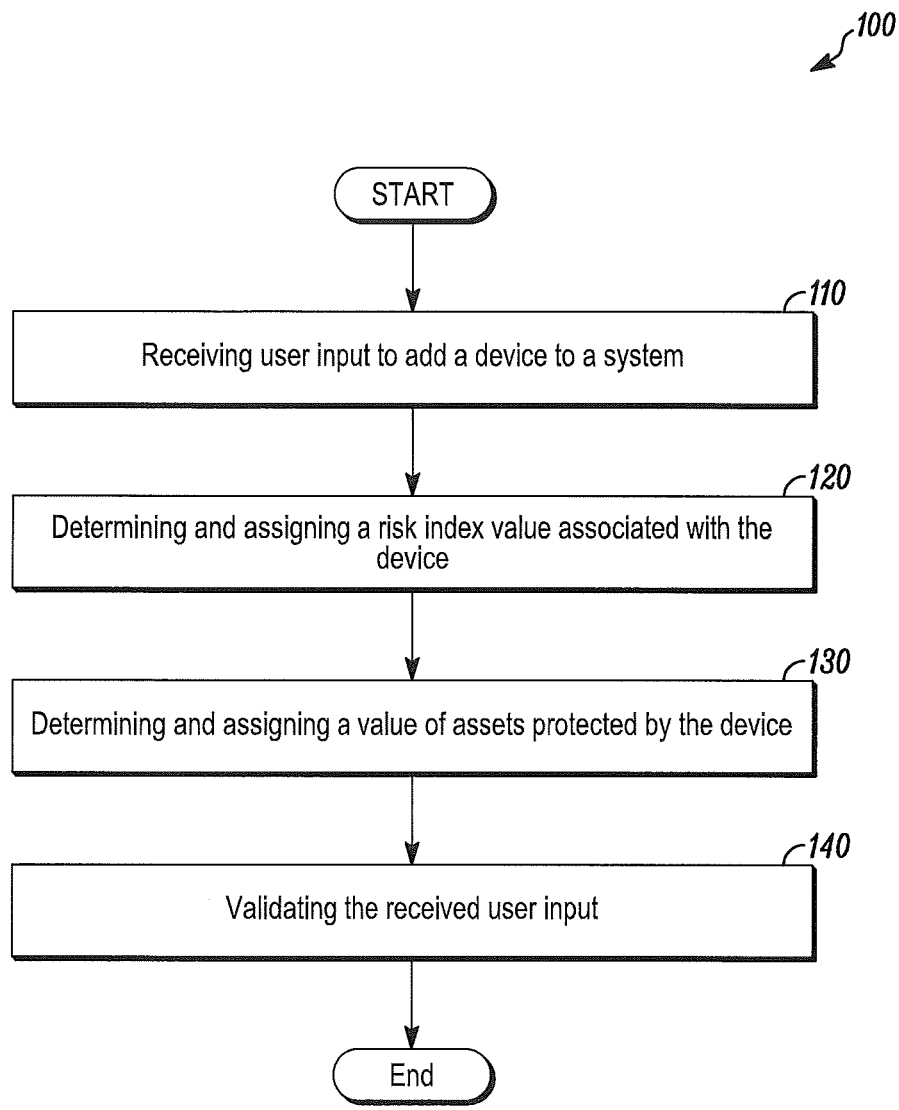
FIG. 1 is a block diagram of a method of commissioning and configuring a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for predicting and displaying site safety metrics. For example, in some embodiments, systems and methods disclosed herein can receive, calculate, identify, predict, prioritize, display, and/or transmit a risk associated with a safety and security system device, such as a sensor device or a video camera. It is to be understood that a safety and security device, as used herein, can include, but is not limited to, individual sensor devices, video cameras, or other elements in a safety and security system, such as a fire alarm system, a loop or wiring in a safety and security system, a control panel of a safety and security system, or an output circuit of a safety and security system.

Systems and methods disclosed herein are described in connection with a safety and security system. However, it is to be understood that systems and methods disclosed herein are not so limited and can be used in connection with any ambient condition monitoring system overseeing a monitored site as would be known and understood by one of ordinary skill in the art.

In accordance with disclosed embodiments, to reduce the need for manual user input and action, systems and methods disclosed herein can identify the severity of an identified risk based on a location thereof within a monitored site. For example, a risk identified in a server, chemical, or gas room can be linked to a high priority risk with a high potential cost associated therewith. Similarly, a risk identified in a cafeteria can be linked to a medium priority risk, but a risk identified in a cooking area can be linked to a high priority risk. Further, a risk identified in a general floor area or hallway can be linked to a low priority risk, but a risk identified in a cubicle area of an office can be linked to a high priority risk.

In some embodiments, systems and methods disclosed herein can validate user input before implementing or executing the same. For example, in some embodiments, systems and methods disclosed herein can receive user input to identify the risk level to be linked to a location within a monitored site. However, if the user input indicates a risk level that would not traditionally be associated with a location, for example, that risks identified in a server room should be linked to a low priority risk, systems and methods disclosed herein can provide the user with a warning of such user input or transmit or display such a warning to other users, for example, supervisors of the monitored site.

In accordance with disclosed embodiments, whenever a safety and security system device, such as a sensor device or video camera, fails, is disabled, a signal or video therefrom is lost, thereby causing a fault in the safety and security system, systems and methods disclosed herein can identify a predetermined risk index level (high, medium, or low) linked to the safety and security device and the potential value of assets at risk as a result thereof. Based on the identified risk index level and the potential value of asset liability, systems and methods disclosed herein can transmit a notification message to a user and can determine and adjust the medium for transmitting such a notification message accordingly. For example, systems and methods disclosed herein can escalate the medium for transmitting a notification message to a user from an email notification message to an SMS notification message when the identified risk index level increases from low to medium or from medium to high.

Similarly, in some embodiments, systems and methods disclosed herein can determine and adjust the recipient of a notification message to a user based on a time when the safety and security system device, such as a sensor device or video camera, fails, is disabled, or a signal or video therefrom is lost. For example, systems and methods disclosed herein can escalate the recipient of a transmitted notification message from an operator to a supervisor when the safety and security system device fails, is disabled, or a signal or video therefrom is lost during a predetermined period of time, for example, during nighttime or holiday hours. In any embodiment, because a user of the safety and security system is informed of faults in a safety and security system from received notifications, the user can determine whether and when to address such faults.

In accordance with disclosed embodiments, systems and methods disclosed herein can identify the value of assets protected by a safety and security system device, such as a sensor device or video camera, calculate, identify, and/or predict the loss impact associated with a fault in the device, and transmit a notification to a user indicative of the same. Furthermore, in some embodiments, systems and methods disclosed herein can escalate the recipient of a transmitted notification message from an operator to a supervisor when the value of assets protected by a safety and security system device, such as a sensor device or a video camera, that is associated with a fault increase or when the loss impact associated with such a device that is associated with a fault increase.

In accordance with disclosed embodiments, systems and methods disclosed herein can provide a user with notifications in real time, post-maintenance, to assist a user in enabling a previously disabled safety and security system device, such as a sensor device or video camera. For example, when a user enables a disabled sensor device, systems and methods disclosed herein can display or transmit the following message to the user: "Have you removed the dust cover from the detector?", and when a user enables a disabled video camera, systems and methods disclosed herein can display or transmit the following message to the user: "Have you validated a video algorithm for the camera?". Similarly, when a user enables a disabled sounder, systems and methods disclosed herein can display or transmit the following message to the user: "Have you checked the external power source?". Further still, when a user enables a disabled sprinkler system, systems and methods disclosed herein can display or transmit the following message to the user: "Have you removed the sprinkler protection cover?". In some embodiments, to complete the enablement of the device or camera, systems and methods can require user input responsive to the displayed or transmitted message as well as user input that identifies the user providing the input.

Systems and methods disclosed herein can provide at least the following novel, and nonobvious advantages over systems known in the art: systems and methods to configure a safety and security system device with a customized priority level that can be situation-based, systems and methods to configure a safety and security system device with an associated risk level, systems and methods to configure a safety and security system device with alternate protection information, systems and methods to configure a safety and security system device with a value of assets protected by the device, systems and methods to test the contamination level of a safety and security system device prior to identifying a fault associated with the device and to predict and report a risk that will be associated with the device should the device enter into fault, systems and methods to calculate and display a loss prediction representation based on configured data for a safety and security system device when an associated control panel receives or identifies a fault event associated with the device, and systems and methods to predict and display a representation of the impact of disabling a safety and security system device in real time and based on configured data.

FIG. 1 is a block diagram of a method 100 of commissioning and configuring a system in accordance with disclosed embodiments. As seen in FIG. 1, the method 100 can include receiving user input to add a device to a system as in 110. In some embodiments, receiving user input to add a device to the system as in 110 can include receiving user input identifying a name and location of the device. Based on the user input received as in 110, the method 100 can include determining and assigning a risk index value associated with the device as in 120 and determining and assigning a value of assets protected by the device as in 130. Finally, the method can include validating the received user input as in 140 to ensure that, when user input is received assigning the risk index value for the device or the value of assets protected by the device, any such user input does not contradict a risk index value or a value of assets protected that would be assigned to the device based on a location thereof.

Figure 2:
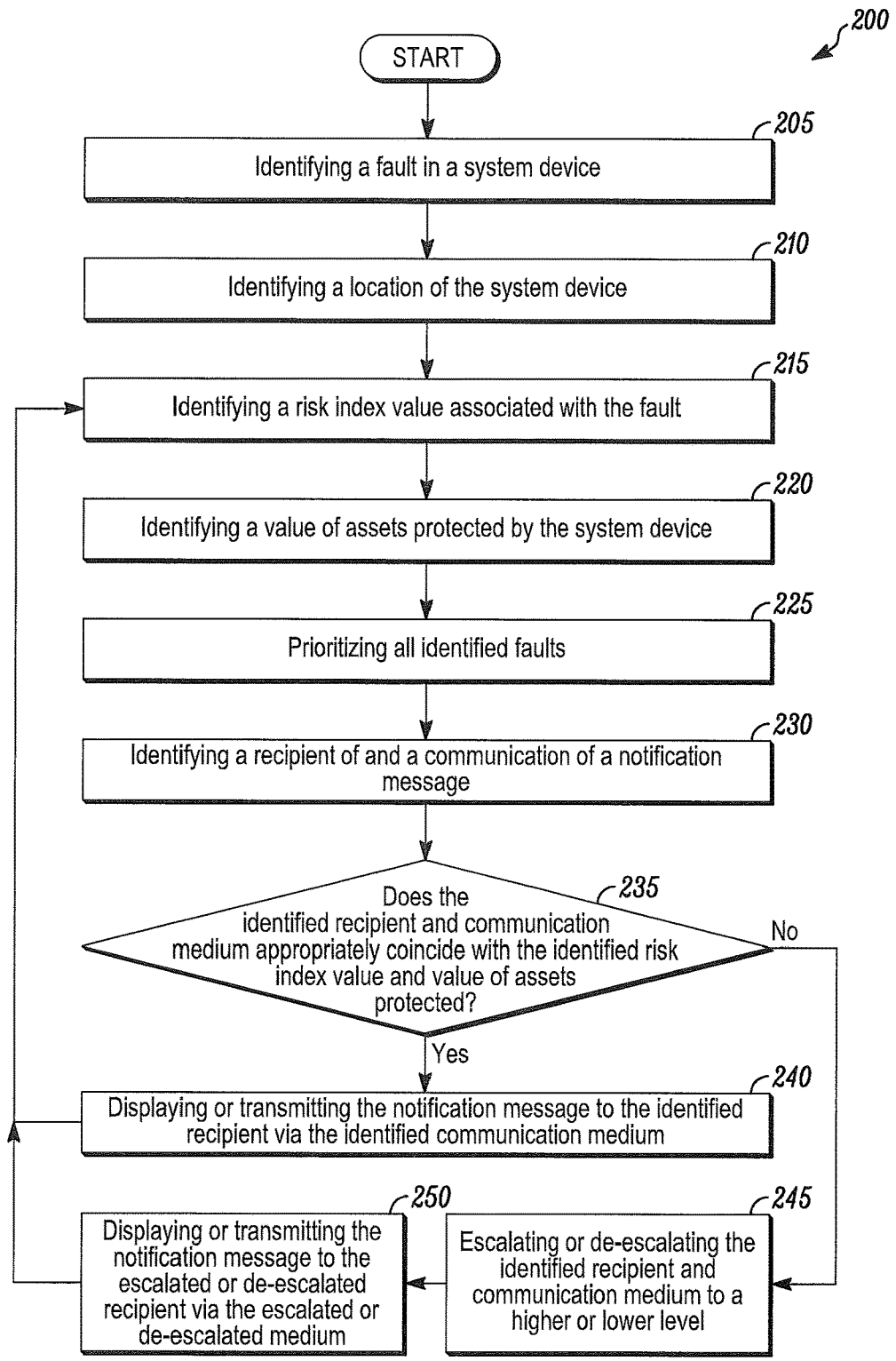
FIG. 2 is a block diagram of a method of running a system in accordance with disclosed embodiments.

FIG. 2 is a block diagram of a method 200 of running a system in accordance with disclosed embodiments. As seen in FIG. 2, the method 200 can include identifying a fault in a system device as in 205, for example, when a system device fails or a user disables a system device, and identifying a location of the system device as in 210. For example, identifying a fault as in 205 can include detecting lost communication with the system device when the device has failed or been disabled for maintenance thereof. Furthermore, identifying the location of the system device as in 210 can include retrieving the location from the user input received as in 110 in the method 100 of FIG. 1.

As seen in FIG. 2, the method 200 can also include identifying a risk index value associated with the fault based on the location of the system device as in 215 and identifying a value of assets protected by the system device based on the location of the system device as in 220. For example, identifying the risk index value as in 215 and the value of assets protected as in 220 can include retrieving such values from the assignment thereof as in 120 and 130 in the method 100 of FIG. 1. After the risk index value and the value of assets protected are assigned as in 215 and 220, the method 200 can include prioritizing all identified faults in the system based on risk index values and values of assets protected as in 225.

To provide notifications to users of the system, the method 200 can include identifying a recipient of and a communication medium for a notification message of the prioritized faults and the risk index values and values of assets protected assigned thereto as in 230, for example, a predetermined or baseline recipient and communication medium, and determining whether the identified recipient and communication method are at a level that appropriately coincides with the assigned risk index values and values of assets protected as in 235. If so, then the method 200 can include displaying or transmitting the notification message to the identified recipient via the identified communication medium as in 240. If not, then the method 200 can include escalating or de-escalating the recipient and the communication medium to a higher or lower level as in 245, for example, escalating the recipient from an operator to a supervisor and escalating the communication medium from email to SMS, and displaying or transmitting the notification message to the escalated or de-escalated recipient via the escalated or de-escalated medium as in 250. The method 200 can periodically, or as system conditions change, assess the system to identify a risk index value of a fault as in 215, to identify a value of assets protected as in 220, and to prioritize identified faults as in 225 and can update, escalate, or de-escalate recipients of and communication mediums for notification messages as in 230, 240, and 245 accordingly.

Figure 3:
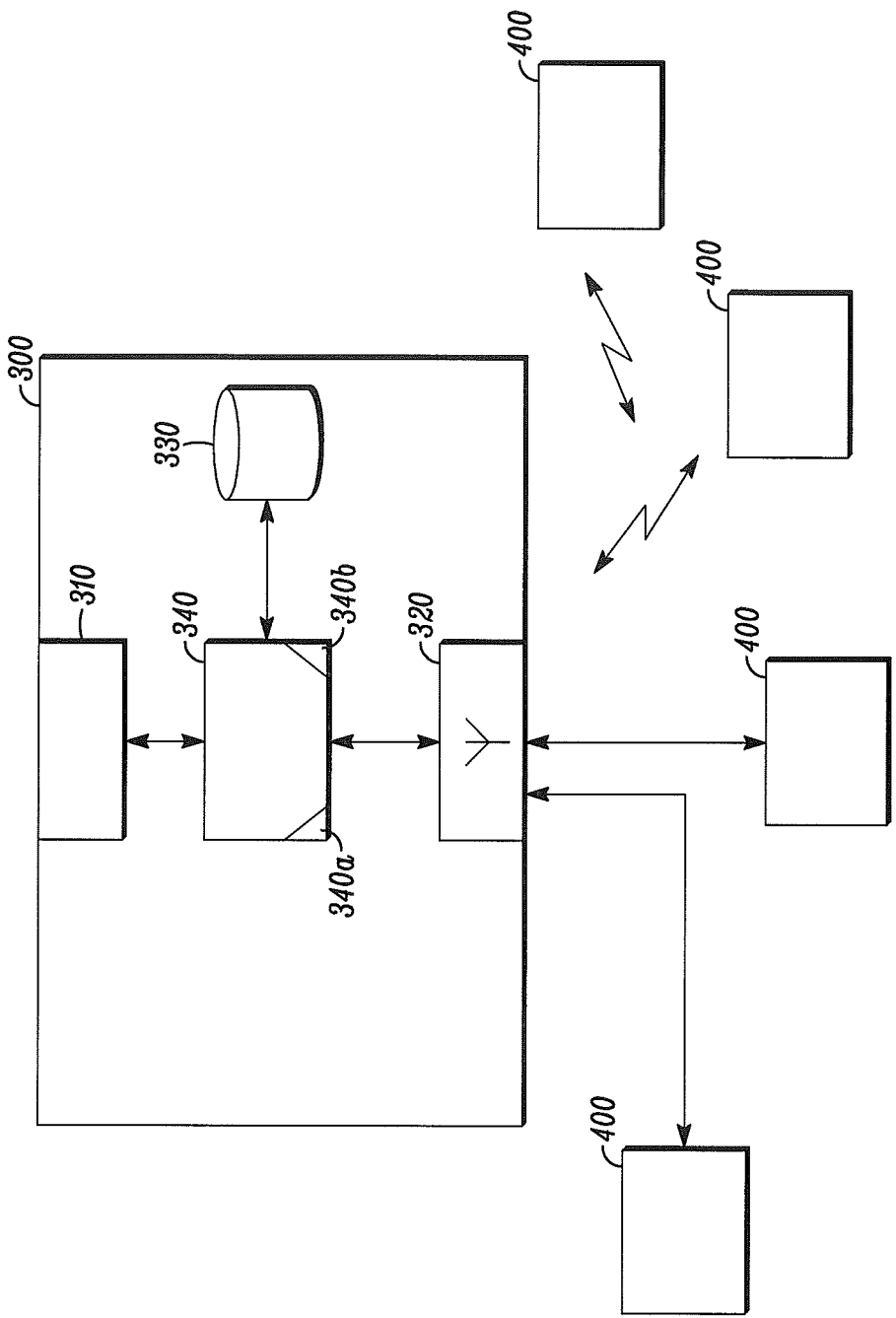
FIG. 3 is a block diagram of a system in accordance with disclosed embodiments.

FIG. 3 is a block diagram of a system 300 in accordance with disclosed embodiments. As seen in FIG. 3, the system 300 can be in wired or wireless communication with a plurality of system devices 400, for example, safety and security system devices, such as sensor devices and video cameras, and can include a user interface device 310, a transceiver device 320, and a memory device 330, each of which can be in communication with control circuitry 340, one or more programmable processors 340a, and executable control software 340b as would be understood by one of ordinary skill in the art. The executable control software 340b can be stored on a transitory or non-transitory computer readable medium, including, but not limited to, local computer memory, RAM, optical storage media, magnetic storage media, flash memory, and the like. In some embodiments, the control circuitry 340, programmable processor 340a, and control software 340b can execute and control at least some of the methods described above and herein.

For example, the user interface device 310 can receive user input to add one of the plurality of system devices 400 to the system 300, and the control circuitry 340, programmable processor 340a, and control software 340b can determine and assign a risk index value associated with the device 400, determine and assign a value of assets protected by the device 400, and validate received user input. In some embodiments, the location of system devices 400 and the risk index values of and values of assets protected by the system devices 400 can be stored in the memory device 330.

The transceiver device 320 can communicate with each of the plurality of system devices 400, and, upon detecting and identifying a fault in any system device 400, the control circuitry 340, programmable processor 340a, and control software 340b can identify a location of the device 400, a risk index value associated with the device 400, and a value of assets protected by the device 400, for example, by retrieving some or all of such information from the memory device 330, and can prioritize all identified faults. The control circuitry 340, programmable processor 340a, and control software 340b can also identify and escalate or de-escalate, as appropriate, recipients of and communication mediums for transmitting a notification message to a user regarding the prioritized faults and the risk index values and values of assets protected assigned thereto and can display any such notification message on the user interface device 310 and/or transmit any such notification message via the transceiver device 320, as appropriate.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
assigning a respective risk index value to each of a plurality of devices;
storing the respective risk index value of each of the plurality of devices in a memory device;
identifying some of the plurality of devices as in fault;
retrieving, from the memory device, the respective risk index value of each of the some of the plurality of devices;
prioritizing respective faults of the some of the plurality of devices based on the respective risk index value of each of the some of the plurality of devices;
identifying a default recipient and a default communication medium;
determining whether associated levels of the default recipient and the default communication medium are appropriate or inappropriate for a highest respective risk index value of the some of the plurality of devices;
when the associated levels are inappropriate, escalating or de-escalating the default recipient and the default communication medium to a second recipient and a second communication medium appropriate for the highest respective risk index value of the some of plurality of devices and transmitting a first notification message indicative of the respective faults of the some of the plurality of devices as prioritized to the second recipient using the second communication medium; and
when the associated levels are appropriate, transmitting the first notification message indicative of the respective faults of the some of the plurality of devices as prioritized to the default recipient using the default communication medium.

2. The method of claim 1 wherein assigning the respective risk index value to each of the plurality of devices includes identifying a respective location of each the plurality of devices and assigning the respective risk index value to each of the plurality of devices based on the respective location.

3. The method of claim 1 wherein assigning the respective risk index value to each of the plurality of devices includes identifying respective assets protected by each of the plurality of devices and identifying respective liability values of the respective assets protected by each of the plurality of devices.

4. The method of claim 1 wherein assigning the respective risk index value to each of the plurality of devices includes receiving user input and assigning the respective risk index value to at least one of the plurality of devices based on the user input.

5. The method of claim 4 further comprising:
validating the user input prior to storing the respective risk index value of the at least one of the plurality of devices in the memory device by comparing the user input to a traditional risk index value for the at least one of the plurality of devices; and when the user input fails to match the traditional risk index value for the at least one of the plurality of devices, transmitting a second notification message indicative of the user input failing to match the traditional risk index value for the at least one of the plurality of devices.

6. The method of claim 1 further comprising:
identifying respective times that each of the some of the plurality of devices is in fault; and
identifying the default recipient and the default communication medium using the respective time that each of the some of the plurality of devices is in fault.

7. The method of claim 1 further comprising:
identifying a restoral of service of one of the plurality of devices; and
transmitting a second notification message indicative of instructions for post-service restoral maintenance.

8. A system comprising:
a transceiver device;
a memory device;
a programmable processor; and
executable control software stored on a non-transitory computer readable medium,
wherein the transceiver device communicates with a plurality of devices,
wherein the programmable processor and the executable control software assign respective a respective risk index value to each of the plurality of devices and store the respective risk index value of each of the plurality of devices in the memory device,
wherein the programmable processor and the executable control software detect some of the plurality of devices as in fault, retrieve, from the memory device, the respective risk index value of each of the some of the plurality of devices, prioritize respective faults of the some of the plurality of devices based on the respective risk index value of each of the some of the plurality of devices, identify a default recipient and a default communication medium, and determine whether associated levels of the default recipient and the default communication medium are appropriate or inappropriate for a highest respective risk index value of the some of the plurality of devices,
wherein, when the associated levels are inappropriate, the programmable processor and the executable control software escalate or de-escalate the default recipient and the default communication medium to a second recipient and a second communication medium appropriate for the highest respective risk index value of the some of plurality of devices and transmit a first notification message indicative of the respective faults of the some of the plurality of devices as prioritized to the second recipient using the second communication medium, and
wherein, when the associated levels are appropriate, the programmable processor and the executable control software transmit the first notification message indicative of the respective faults of the some of the plurality of devices as prioritized to the default recipient using the default communication medium.

9. The system of claim 8 wherein the programmable processor and the executable control software identify a respective location of each the plurality of devices and assign the respective risk index value to each of the plurality of devices based on the respective location.

10. The system of claim 8 wherein the programmable processor and the executable control software assigning the respective risk index value to each of the plurality of devices includes the programmable processor and the executable control software identifying respective assets protected by each of the plurality of devices and identifying respective liability values of the respective assets protected by each of the plurality of devices.

11. The system of claim 8 further comprising:
a user interface device,
wherein the user interface device receives user input, and
wherein the programmable processor and the executable control software assign the respective risk index value to at least one of the plurality of devices based on the user input.

12. The system of claim 11 wherein the programmable processor and the executable control software validate the user input prior to storing the respective risk index value of the at least one of the plurality of devices in the memory device by comparing the user input to a traditional risk index value for the at least one of the plurality of devices, and when the user input fails to match the traditional risk index value for the at least one of the plurality of devices, transmit a second notification message indicative of the user input failing to match the traditional risk index value for the at least one of the plurality of devices.

13. The system of claim 11 wherein the programmable processor and the executable control software transmit the first notification message by displaying the first notification message on the user interface device.

14. The system of claim 8 wherein the programmable processor and the executable control software transmit the first notification message via the transceiver device.

15. The system of claim 8 wherein the programmable processor and the executable control software identify respective times that each of the some of the plurality of devices is in fault and identify the default recipient and the default communication medium using the respective time that each of the some of the plurality of devices is in fault.

16. The system of claim 8 wherein, when the programmable processor and the executable control software identify a restoral of service of one of the plurality of devices, the programmable processor and the executable control software transmit a second notification message indicative of instructions for post-service restoral maintenance.

* * * * *